A. MERTENS.
AUTOMATIC GAS ANALYZER.
APPLICATION FILED MAY 16, 1911.
1,060,996.
Patented May 6, 1913.
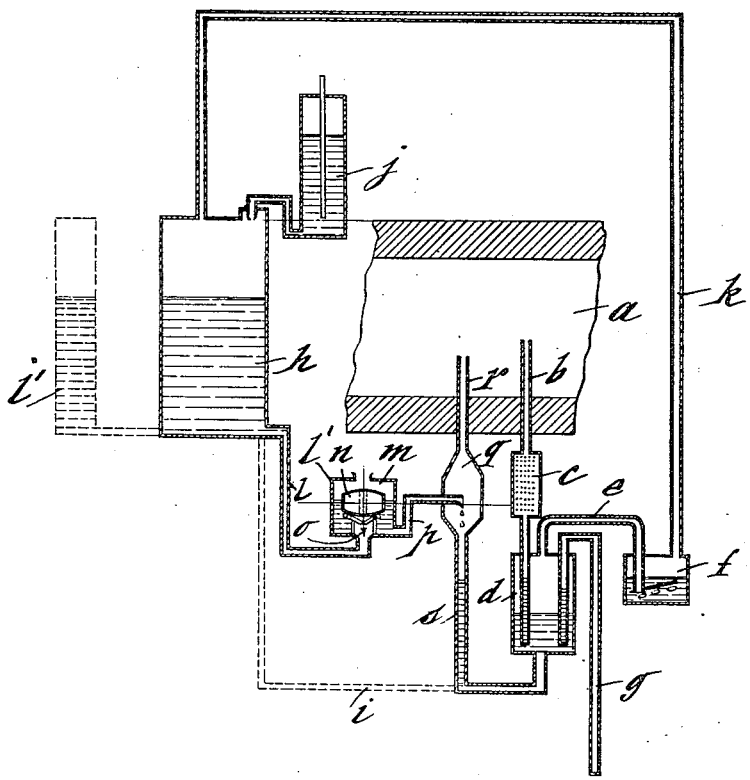

UNITED STATES PATENT OFFICE.

ALBERT MERTENS, OF CRUYBEKE, BELGIUM.

AUTOMATIC GAS-ANALYZER.

1,060,996.　　　　　Specification of Letters Patent.　　Patented May 6, 1913.

Application filed May 16, 1911. Serial No. 627,429.

*To all whom it may concern:*

Be it known that I, ALBERT MERTENS, engineer, a subject of the King of Belgium, residing at Cruybeke, Flandre Orientale, in the Kingdom of Belgium, have invented new and useful Improvements in Automatic Gas-Analyzers, of which the following is a specification.

This invention relates to an automatic gas analyzer which is designed to measure, in a mixture of several gases, the proportion in volume of one or more of the constituent gases, and which is more particularly suitable for measuring the percentage of carbonic acid in the products of combustion of a furnace.

The apparatus is chiefly distinguished from known apparatuses of this same kind by the fact that it does not register for each analysis the proportion in volume of the gas under consideration but gives at the end of a determined time a mean result covering a determined number of analyses. To this end the apparatus which, as usual, comprises a gas measuring vessel, and an absorber, is characterized by the fact that the gas measuring vessel is fed with liquid by a receptacle of given volume connected to a kind of Mariotte bottle tending to compensate for any flow of liquid in the said receptacle directly a depression is produced therein, and also by the fact that the absorber is connected to the said receptacle in such a way that the volume of gases remaining after passage through the absorber is sent into the receptacle feeding the gas measuring vessel. In these conditions at each operation of the gas measuring vessel there issues from the receptacle which feeds it, a volume of liquid corresponding to the capacity of gas displacer and there enters into the receptacle a volume of gas corresponding to the capacity of the gas measuring vessel less the quantity of gas absorbed so that the Mariotte bottle furnishes to the feeding receptacle a volume of liquid serving solely to make up the difference between the volume of liquid which has left and the volume of gas entering the receptacle, that is to say, the volume of gas absorbed in the absorber. Therefore, by a simple proportion the relation of the quantity of absorbed gas to the total quantity of gas which has been analyzed can, after a suitable number of analyses, be easily established.

In practice the apparatus can advantageously be combined with a delivery regulator allowing of proportioning the volume of gases analyzed in a unit of time to the pressure existing in the inclosure containing the gases, for example, to the draft of the flue to which the apparatus is connected if the percentage of carbonic acid in the products of combustion of a furnace is to be measured.

The accompanying drawing illustrates diagrammatically by way of example, a means of carrying out the invention.

In this drawing, $a$ indicates a flue to which is connected by a pipe $b$ provided with a dust filler $c$ a gas measuring vessel $d$, connected by a pipe $e$ to an absorber $f$ of suitable construction. The suction of the gas into the measuring vessel $d$ is effected by the automatic emptying of the gas measuring vessel $d$ through the medium of a siphon $g$. The forcing of the gas into the absorber $f$ is effected through the feeding of the vessel $d$ with a liquid (such as water for example) conducted from a receptacle $h$ through a pipe $i$. It will easily be seen that this operation is entirely automatic, the liquid flowing from the receptacle $h$ into the vessel $d$ until the moment when the siphon $g$ automatically fills and causes the rapid emptying of the vessel $d$, which emptying is accompanied by a suction of gas which stops when the siphon empties itself and the forcing of the gas sucked in recommences by a fresh arrival of liquid from the receptacle $h$.

According to the invention, the receptacle $h$ is a closed vessel connected to a Mariotte bottle $j$ regulated so as to cause the flow of a certain quantity of liquid from the receptacle $h$ directly a depression is produced therein. Moreover, the absorber $f$ is connected by a pipe $k$ to the receptacle $h$ so that the non-absorbed gas is forced into the receptacle $h$. It is now easy to understand the working of the apparatus. The Mariotte bottle $j$, as well as the receptacle $h$ is provided with a graduation allowing of easily ascertaining the volumes of liquid which have flowed therefrom. Consequently when, at the end of a given time, after a certain number of hours work for example, it is desired to have an idea of the mean conditions of working of the furnace (for example, the mean proportion of carbonic acid contained in the products of combustion) it is only necessary to take note of the quantity of liquid which has run from the Mariotte bottle $j$ as well as the quantity of liquid which has run from the receptacle $h$. This latter quantity is easily determined by adding to the volume V indicated by the graduation as having flowed from the receptacle $h$, the volume $v$ of the liquid which has flowed from the Mariotte bottle $j$. The proportion $$\frac{v}{V+v}$$

then immediately gives the proportion of the gas absorbed with relation to the total quantity of gas treated.

I would remark that in the apparatus thus constructed no account is taken of the extra quantities of liquid that are required after each operation, to fill the pipes, the siphon $g$ and other clearance spaces. In order to furnish the necessary quantity of liquid to compensate for the effect of these clearances, a compensating vessel $i'$, indicated in dotted lines in the drawing, is connected to the receptacle $h$. Owing to the presence of this vessel the receptacle $h$ furnishes only the quantity of water corresponding to the volume of gas forced into the absorber, while the vessel $i'$ furnishes what is necessary to fill said spaces or clearances.

The described apparatus can obviously serve for measuring the proportion in volume of a certain gas contained in any gaseous mixture. When it is required to measure the percentage of carbonic acid in the products of combustion of a furnace with the object of ascertaining the loss of fuel which results from imperfect combustion it is not sufficient to know the mean percentage of carbonic acid in a collection of samples taken at regular intervals; it is not even sufficient to know the percentage of carbonic acid in each of the samples taken separately as given by registering analyzers; in fact, the loss of fuel during a given time varies not only with the mean percentage of carbonic acid in the products of combustion during this time, but also with the quantity of gas which has passed into the flue during the same time. To take account of this fact, it is useful according to the invention to cause the volume of gases analyzed in the unit of time to vary with draft of the flue. To this end instead of connecting the receptacle $h$ directly to the gas measuring vessel $d$ by the pipe $i$, the delivery of the receptacle $h$ can advantageously be regulated by a regulator $l'$. In this case the pipe $l$ leading from the receptacle $h$ and replacing the pipe $i$, extends into a chamber $m$ in which the level is maintained constant by a float $n$ which more or less closes the liquid inlet through the medium of a needle valve $o$. The chamber $m$ is provided with an overflow pipe $p$ the end of which is at the same level as the liquid contained in the chamber $m$. This pipe $p$ extends into a chamber $q$ connected to the flue by a pipe $r$ and to the gas measuring vessel $d$ by a pipe $s$. In these conditions the quantity of liquid which flows from the receptacle $h$ into the chamber $m$ and consequently toward the gas measuring vessel $d$ varies with the intensity of the depression which is produced in the flue $a$, and it is the extent of the depression which regulates the delivery. The mouth of the pipe $p$ can obviously be at a higher or lower level than the liquid in the chamber $m$ according to the effect which it is sought to obtain.

The described apparatus is of very simple construction and inexpensive and it is distinguished by the absence of any parts liable to wear or to become disarranged. Its management is very easy and the addition of the delivery regulator gives an essentially new result by allowing of regulating the gaseous volume in a unit of time according to the depression existing in the flue.

What I claim is:

1. In an automatic gas analyzer, a gas sampling tube, a gas measuring vessel, a gas absorber, connected with the gas measuring vessel, a closed receptacle containing a liquid, said receptacle being connected with the absorber and with the gas measuring vessel and a Mariotte bottle also connected to said receptacle whereby the non absorbed gases can be sent into said receptacle and the Mariotte bottle is adapted to furnish a volume of liquid corresponding to the volume of gas absorbed.

2. In an automatic gas analyzer, in combination with a flue, a gas measuring vessel connected to said flue, means for sucking gas from the flue into the gas measuring vessel, a gas absorber connected to the gas measuring vessel, means for forcing the gas contained in the gas measuring vessel into the gas absorber, a closed receptacle adapted to contain a suitable liquid, a connection between said receptacle and the gas measuring vessel whereby the liquid contained in said receptacle is adapted to flow into the gas measuring vessel, a connection between said receptacle and the gas absorber, whereby the non-absorbed gas can be sent into said receptacle and a Mariotte bottle connected to said receptacle.

3. In an automatic gas analyzer in combination with a flue, a gas measuring vessel connected to said flue, means for sucking gas from the flue into the gas measuring vessel, a gas absorber connected to the gas measuring vessel, means for forcing the gas contained in the gas measuring vessel into the gas absorber, a closed receptacle adapted to contain a suitable non-absorbent liquid, a pipe connecting the lower part of said receptacle with the gas measuring vessel, whereby the liquid contained in said receptacle is adapted to flow into the gas measuring vessel, a second pipe connecting the upper part of said receptacle with the gas absorber whereby the non-absorbed gas can be sent into said receptacle and a Mariotte bottle connected to the upper part of said closed receptacle.

4. In an automatic gas analyzer, in combination with a flue, a gas measuring vessel connected to said flue, means for sucking gas from the flue into the gas measuring vessel, a gas absorber connected to the gas measuring vessel, means for forcing the gas from the gas measuring vessel into the gas absorber, a closed receptacle adapted to contain a suitable liquid, a pipe connecting the lower part of said receptacle with the gas measuring vessel, a second pipe connecting the upper part of said receptacle with the gas absorber, a Mariotte bottle connected to the upper part of said closed receptacle and means for compensating the clearances in the several parts and pipes.

5. In an automatic gas analyzer, in combination with a flue, a gas measuring vessel connected to said flue, means for sucking gas from the flue into said gas measuring vessel, a gas absorber connected to the gas measuring vessel, means for forcing the gas from the gas measuring vessel into the gas absorber, a closed receptacle adapted to contain a suitable liquid, a pipe connecting the lower part of said receptacle with the gas measuring vessel, a second pipe connecting the upper part of said receptacle with the gas absorber, a Mariotte bottle connected to the upper part of said closed receptacle and a compensating vessel connected with said closed receptacle, and designed to furnish the necessary liquid for compensating for clearances.

6. In an automatic gas analyzer, in combination with a flue, a gas measuring vessel connected to said flue, means for sucking gas from the flue into said gas measuring vessel, a regulator whereby the delivery of the gas measuring vessel can be proportioned to the pressure existing in the flue from which the gas is drawn, a gas absorber connected to the gas measuring vessel, means for forcing the gas from the gas measuring vessel into the gas absorber, a closed receptacle adapted to contain a suitable liquid, a pipe connecting the lower part of said receptacle with the gas measuring vessel, a second pipe connecting the upper part of said receptacle with the gas absorber and a Mariotte bottle connected to the upper part of said closed receptacle.

In testimony whereof I have signed my name to this specification in the presence of two subscribing witnesses.

ALBERT MERTENS.

Witnesses:
JACQUES REED,
G. ROOSEVELT PHELAN.